United States Patent [19]

Campbell et al.

[11] 3,966,063

[45] June 29, 1976

[54] LARGE ROUND BALE HANDLING APPARATUS

[75] Inventors: Willis R. Campbell, Ephrata; Thomas W. Waldrop; Shaun A. Seymour, both of New Holland, all of Pa.

[73] Assignee: Sperry Rand Corporation, New Holland, Pa.

[22] Filed: Dec. 5, 1974

[21] Appl. No.: 529,982

[52] U.S. Cl. .............................. 214/83.36; 214/506; 198/7 BL; 214/83.26; 214/509
[51] Int. Cl.² .......................................... B60P 1/38
[58] Field of Search ........... 214/501, 505, 506, 508, 214/509, 519–522, 83.26, 83.36, 83; 198/7 BL, 11, 13, 137; 56/344–364

[56] References Cited
UNITED STATES PATENTS

| | | | |
|---|---|---|---|
| 645,851 | 3/1900 | Hebert | 198/11 X |
| 1,552,715 | 9/1925 | Lutz | 198/11 |
| 2,230,139 | 1/1941 | Gustin | 198/13 X |
| 2,526,960 | 10/1950 | McElhinney et al. | 56/364 |
| 2,704,150 | 3/1955 | Scranton | 198/13 X |

Primary Examiner—Albert J. Makay
Attorney, Agent, or Firm—John R. Flanagan; Frank A. Seemar; Joseph A. Brown

[57] ABSTRACT

An apparatus for handling large round bales or the like includes a mobile frame adapted for movement across a field and a bed assembly mounted thereon. The bed assembly includes a plurality of elongated, laterally spaced rails capable of being disposed in an inclined position with respect to the frame in which forward ends of the rails are disposed adjacent the field. A flexible endless conveyor chain is movably mounted on and along each rail and has bale-engaging lugs moving along a path extending along and above an upper side of each rail and around and beyond the forward end of each rail for delivering a bale or the like from the field to the forward ends of the rails when the rails are disposed in the inclined position. A ground engaging element is attached to and extends along and below each forward rail end for supporting the rail end above the field. Each element has an opening therethrough for allowing passage of the chain and lugs and engagement of the lug with the field for facilitating insertion of the rail end under the bale as the apparatus is moved across the field in the direction of the bale.

6 Claims, 15 Drawing Figures

LARGE ROUND BALE HANDLING APPARATUS

CROSS REFERENCES TO RELATED APPLICATIONS

Reference is hereby made to the following co-pending U.S. applications dealing with related subject matter and assigned to the assignee of the present invention:
1. "Large Round Bale Handling Apparatus" by Shaun A. Seymour, U.S. Ser. No. 648,609, filed Jan. 12, 1976, a continuation of copending U.S. Ser. No. 529,983, filed Dec. 5, 1974, now abandoned.
2. "Large Round Bale Handling Apparatus" by John K. Hale et al, U.S. Ser. No. 529,984, filed Dec. 5, 1974.
3. "Large Round Bale Handling Apparatus" by Willis R. Campbell, U.S. Ser. No. 529,990, filed Dec. 5, 1974.

BACKGROUND OF THE INVENTION

1. Field of the Invention

The present invention relates generally to the art of handling crop material and, more particularly, is concerned with apparatus for handling crop material packages such as large round bales or the like.

2. Description of the Prior Art

For many years now, the predominate method of harvesting crop material such as hay or the like in the United States and many other countries has been to continuously pick up the previously cut and windrowed hay and form it into small wire- or twine-tied rectangular bales with an automatic baler, the bales normally ranging in weight from approximately 50–125 pounds.

Over the years, the automatic baler method of harvesting hay has usually necessitated the assistance of a crew of persons, in addition to the baler operator, in handling and storing the bales. In recent years, the availability of hay harvesting labor has become more scarce and labor costs have steadily risen. However, the impact of these unfavorable conditions on the popularity of the automatic baler method has been greatly minimized during the past decade by the introduction and growing commercial acceptance of the automatic bale wagon, which was originally illustrated and described in U.S. Pat. No. 2,848,127 and more recently, for example, in U.S. Pat. No. 3,502,230. In many parts of the United States, the automatic baler method has been largely integrated into a completely automatic, substantially one-man hay harvesting and handling system by the aforementioned bale wagon which is believed to have assured the continued, widespread viability and soundness of the automatic baler method of harvesting hay.

However, even in view of the widespread acceptance of the automatic baler method and the growing acceptance of the automatic bale wagon, other alternative methods of harvesting hay have periodically been proposed and introduced over the years.

One alternate method recently introduced utilizes a hay roll forming machine or baler which picks up loose windrowed hay or the like and forms it into a large round bale or roll normally ranging in weight from approximately 600 to 1500 pounds, in axial length from approximately 4½ to 5½ feet and in diameter from approximately 4½ to 6 feet. This large round bale method of harvesting hay has been realizing considerable commercial acceptance in various regions of the United States. The success of this method is in part due to the acceptable moisture shedding and weathering attributes of the large roll when it is left resting in the field. Such attributes eliminate the necessity for immediate removal of the rolls from the field after they have been formed and deposited there by the baler, as is ordinarily required in the utilization of the small rectangular bale method in order to protect such bales from the sudden onset of inclement weather which frequently occurs in most regions of the country during the hay harvesting season.

While such attributes eliminate the need for the farmer to devote immediate attention to handling the large bales and thereby allow removal, if desired, at a later time during slack periods, efficient handling methods must be devised in order to make the large round bale or roll method feasible as a one-man hay harvesting and handling system for the large farmer. Since the size of such bales do not lend themselves to being handled by the manual labor of several persons, let alone one man, some mechanical means for handling them must be provided.

Single large round bale handling units currently available, such as three-point hitch, tractor mounted rear end loaders and tractor mounted front end loaders, are believed to be adequate for a farmer that has just a few bales to move. However, such units are uneconomical and inefficient for farming operations where large numbers of these bales must be removed from the field, transported to distant feedlots or storage areas and further handled at such locations in carrying out livestock feeding operations.

SUMMARY OF THE INVENTION

The present invention relates to an apparatus which provides an efficient and economical means for handling a plurality of crop material packages, such as large round bales or the like, and thereby integrates the large roll baler method of hay harvesting into a completely automatic, substantially one-man harvesting and handling system.

The apparatus of the present invention includes a mobile frame and a bed assembly mounted thereon. The bed assembly includes a plurality of elongated, laterally spaced apart support members, preferably in the form of a pair of elongated rails, capable of being disposed in an inclined position in which the same one ends of the support members are disposed adjacent the field.

The apparatus further includes means, preferably in the form of an endless flexible conveyor chain, movably mounted on and along each support member and having outer portions moving along a path extending along and above an upper side of each support member and around and beyond the same one end of each member for delivering a bale or the like from the field to the same one ends of the support members when the members are disposed in the inclined position. Means is provided for driving the movable means.

Still further, the apparatus includes a ground engaging element attached to and extending along and below the same one end of each member for supporting the member end above the field. Each element has an opening therethrough for allowing passage of the movable means on the support member and the outer portions thereof and engagement of the outer portions of the movable means with the field for facilitating insertion of the member end under the bale as the apparatus is moved across the field in the direction of the bale.

Each of the ground-engaging elements includes an elongated flat base portion disposed flush with the surface of the field for sliding contact therewith when the support members are disposed in the inclined position and the apparatus is moved across the field. Each of the elements further includes a front nose portion merging with the base portion and being upturned at an acute angle with respect to the plane of the base portion. The opening in each element is defined in the nose portion in the form of a slot which opens at the forward edge of the nose portion.

The apparatus of the present invention is versatile in that it is capable of handling large round bales in any of several ways which serve the several end uses or purposes which most farmers contemplate for the bales. Specifically, the apparatus may be used to retrieve or pick up bales in the field and transport multiple numbers of them to a storage area. In those farming operations where feeding of livestock is carried out in the field or pasture instead of in feedlots, the apparatus may also be used to retrieve multiple numbers of bales which had been previously moved to a storage area, then move the bales back to a desired field location and replaced them back on the field with the same previously weathered bottom portion of the bale again resting on the field. Such controlled handling of the bales minimizes the amount of spoilage of the hay therein, which results after they have been returned to the field. Further, the apparatus is capable of retrieving multiple numbers of bales from the field or storage area and unloading them onto the bed of a truck or wagon if the farmer desires to transport the bales over greater distances than is feasible with a tractor and the retrieving apparatus itself. Also, the apparatus is capable of retrieving both newly formed bales having a solid, cylindrical form and ones which are somewhat flattened or oval in shape after they have been resting for several months, with a minimal of disturbance to the shape and appearance of either.

These and other advantages and attainments of the present invention will become apparent to those skilled in the art upon a reading of the following detailed description when taken in conjunction with the drawings in which is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the apparatus and facing in the direction of forward travel. Also, in the following description, it is to be understood that such terms as "forward," "left," "upwardly," etc., are words of convenience and are not to be construed as limiting terms.

THE BALE HANDLING APPARATUS

Figure 1:
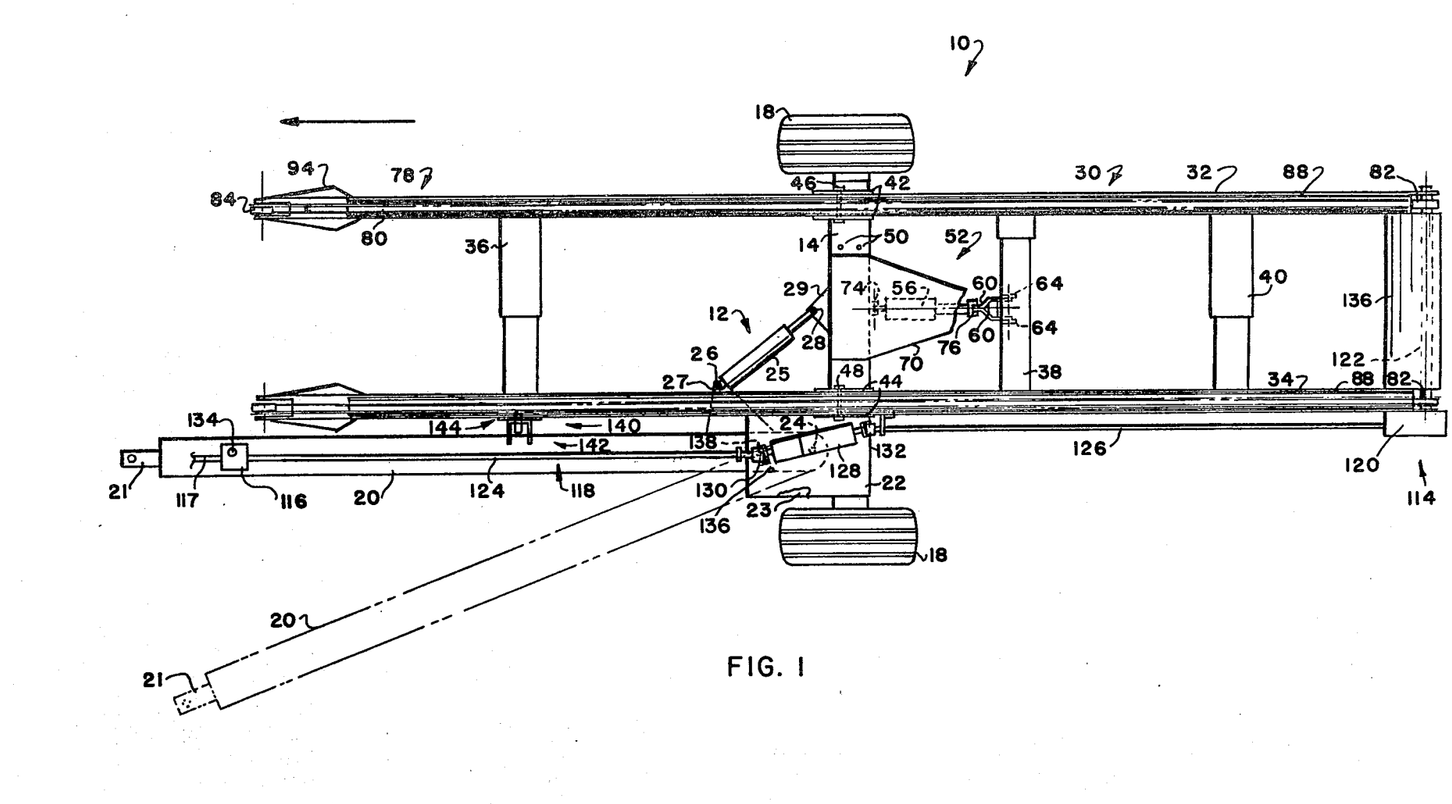
FIG. 1 is a top plan view of a bale handling apparatus embodying the principles of the present invention.
Figure 2:
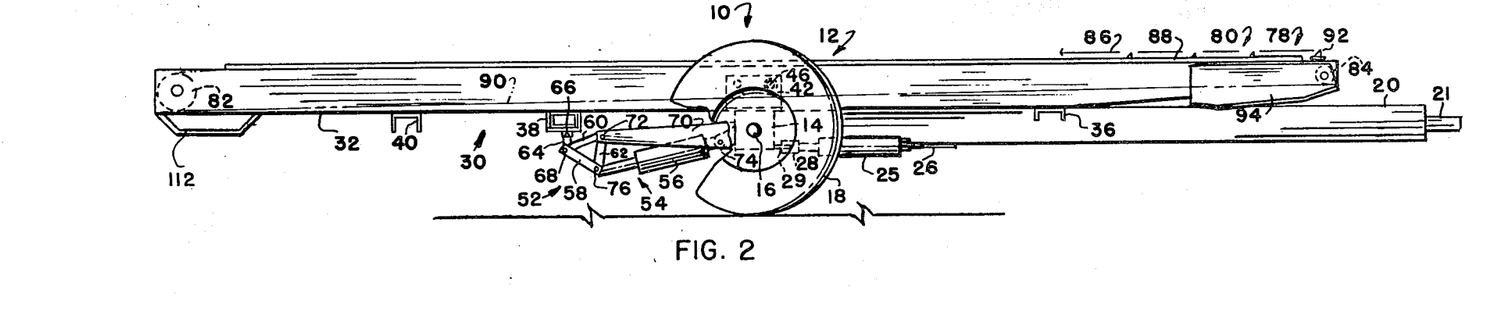
FIG. 2 is an elevational view as seen from the right side of the apparatus of FIG. 1, showing the bed assembly of the apparatus disposed in a generally horizontal position.

Referring now to the drawings, and particularly to FIGS. 1 and 2, there is shown an apparatus for handling crop material packages, such as large round bales or the like, the apparatus being indicated generally by numeral 10 and forming the preferred embodiment of the present invention (the apparatus being viewed from its right side in FIG. 2).

The apparatus 10 is provided with a mobile frame, generally indicated at 12, which includes a beam 14 having a tubular structure with axially aligned spindles 16 fixed at opposite ends thereof and a ground wheel 18 being rotatably mounted to each of the spindles 16 about a common horizontal axis defined by the spindles 16. The ground wheels 18, therefore, mount the beam 14 so as to extend in a transverse relation to the direction of forward travel of the apparatus 10, as indicated by the arrow in FIG. 1.

The mobile frame 12 of the apparatus 10 is adapted for towing behind a vehicle, such as a tractor (not shown), by an elongated draft member or tongue 20. The draft member 20, being of a tubular construction, has a hitch element 21 fixed thereon at its forward end which is adapted for securement to the drawbar (not shown) of the towing vehicle to be located at the front of the apparatus 10. At its rear end, the draft member 20 extends between a pair of spaced apart horizontal plates 22, 23 fixed to and extending forwardly from the upper and lower sides of the frame beam 16 adjacent the left end thereof. The rear end of member 20 is mounted by a pin 24 to the plates 22, 23 for pivotal movement in relation thereto and, consequently, in relation to the frame 12 about a generally upright or vertical axis defined by the pin 24. The member 20 is not movable vertically in relation to the frame 12. Therefore, the draft member 20 and the frame 12, in effect, form a substantially rigid structure with reference to a vertical plane which structure is not rotatable about the common axis of ground wheels 18 and is disposed as seen in FIG. 2 when the draft member 20 is attached to the towing vehicle.

In order to actuate pivotal movement of the draft member 20 in relation to the frame 12 about the upright axis defined by pin 24, there is provided means, preferably being a hydraulic cylinder 25, coupled between the beam 14 of frame 12 and the draft member 20. The hydraulic cylinder 25 is of the double-acting type and is supplied with fluid under pressure through hydraulic lines (not shown) from any suitable source, such as the tractor hydraulic system. The cylinder 25 is pivotally anchored at its forward cylinder end at 26 to a bracket 27 fixed to the rearward right side of the draft member 20 and pivotally coupled at its near piston end at 28 to a bracket 29 fixed to the front side of the frame beam 14. When the hitch 21 of the draft member 20 is attached to the towing vehicle, extension and retraction of the cylinder 25 has the effect of pivoting the frame 12 away from and toward the draft member 20.

A bed assembly, generally indicated by numeral 30, is mounted to the mobile frame 12. The assembly 30 includes a pair of elongated support members or rails 32, 34 and transverse members 36, 38, 40 which interconnect with the lower sides of the rails 32, 34 and dispose the rails 32, 34 in laterally spaced apart relationship from each other. The right rail 32 extends between a pair of upright spaced apart plates 42 mounted to the upper side of the frame beam 14 adjacent to and inwardly from the right ground wheel 18 at the right end of the beam 14. The left rail 34 extends between another pair of upright spaced apart plates 44 mounted to the upper side of the frame beam 14 adjacent to and inwardly of the upper draft member mounting plate 22 at the left end of the beam 14. Right and left pivot pins 46, 48 are respectively secured to and extend between the pairs of plates 42, 44 and respectively through right and left rails 32, 34 so as to pivotally mount the rails 32, 34 generally intermediately between their respective opposite ends to respective plate pairs 42, 44 about a generally common horizontal axis defined by the pins 46, 48. The rails 32, 34 in being so mounted are disposed with their respective lower sides spaced above the upper side of the frame beam 14 so as to provide sufficient clearance therebetween for accommodating pivotal movement of each of the rails 32, 34 in a vertical plane with respect to the frame beam 14.

The rails 32, 34 are preferably intended to support a plurality of large round bales extending end-to-end therealong with the longitudinal axis of each bale extending generally parallel to the rails 32, 34. Therefore, since a lower longitudinal portion of each bale, because of its cylindrical shape, extends somewhat downwardly between the rails 32, 34, the rails 32, 34 have a predetermined height designed to allow sufficient clearance between the lower bale portion and the upper sides of the frame beam 14 and the transverse members 36, 38, 40. In effect, an elongated, unobstructed channel or passageway within which the lower bale portion may extend is defined between the rails 32, 34.

Furthermore, it is desirable that the bed assembly 30 be capable of accommodating round bales having various diameter sizes. The bales presently formed by commercially-available roll balers generally range in diameter size from 4½ to 6 feet. It has been found that bales falling within this diameter size range may be satisfactorily handled by providing the rails 32, 34 of the bed assembly 30 at one of two possible spacings. One spacing is illustrated in FIG. 1 for handling bales at the upper half of this range. The other spacing for handling bales at the lower half of this range is provided by unfastening right pivot pin 46, relocating the right rail 32 to the inner side of the inside plate of the right pair of plates 42 and then relocating the outside plate of the pair 42 on the interior side of the right rail 32. Holes 50 are provided in the beam 14 for mounting the relocated outside plate to the beam 14 with bolts (not shown). Finally, right pivot pin 46 may be refastened through the right plate pair 42 and right rail 32. It is readily apparent that additional space settings for the rails 32, 34 could be provided, if desired.

In order to change the spacing between the rails 32, 34, the transverse members 36, 38, 40 interconnecting them must be adjustable. Therefore, as shown in FIG. 1, each of the transverse members 36, 38, 40 are formed by two separate, telescoping right and left pieces. Each right piece is fixed to the underside of the right rail 32 and each left piece is fixed to the underside of the left rail 34. Holes (not shown) are provided in each right piece which align with holes in each left piece at each of the two space settings of the rails 32, 34. Bolts (not shown) are used to fasten the respective pieces of each transverse member together.

Figure 3:
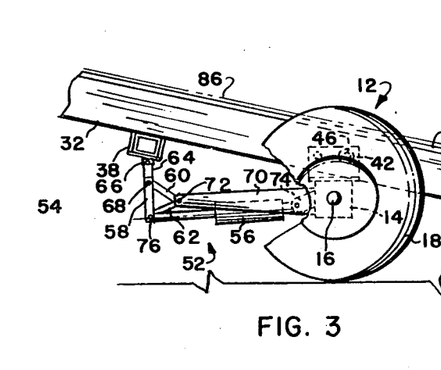
FIG. 3 is an elevational view of a fragmentary portion of the apparatus as seen in FIG. 2, but showing the bed assembly in a rearwardly inclined position.
Figure 4:
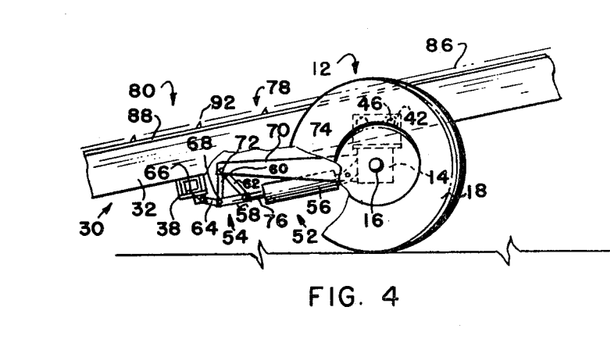
FIG. 4 is an elevational view of a fragmentary portion of the apparatus as seen in FIG. 2, but showing the bed assembly in a forwardly inclined position.

In order to actuate pivotal tilting of the bed assembly 30 relative to the frame 12 and support the bed assembly 30 at any of the positions illustrated in FIGS. 2 through 4, there is provided means, generally indicated by numeral 52, located rearwardly of the frame beam 14.

The means 52 includes a linkage assembly 54 pivotally coupled to the bed assembly 30 and a hydraulic cylinder 56 pivotally coupled between the frame 12 and the linkage assembly 54. The hydraulic cylinder 56 is of the double acting type and is supplied with fluid under pressure through hydraulic lines (not shown) from any suitable source, such as the tractor hydraulic system.

The linkage assembly 54 is designed to maximize tilting of the bed assembly 30 to its rearwardly and forwardly inclined position upon extension and retraction of the hydraulic cylinder 56. The assembly 54 includes a pair of rearwardly-diverging lower links 58, a pair of rearwardly-diverging upper links 60 being fixed at their ends to the rear ends of the lower links 58, and a pair of straight front links 62 which extends between and are fixed at opposite ends respectively to the forward-converging ends of the lower links 58 and upper links 60.

The linkage assembly 54 is coupled to the bed assembly 30 by a pair of spaced apart links 64 which are pivotally fastened at their upper ends at 66 to the underside of the transverse member 38 and depend therefrom to lower ends which are pivotally fastened at 68 to the respective rear ends of the lower and upper links 58, 60 of the linkage assembly 54.

The linkage assembly 54 is further coupled to the frame 12 by a tapered bracket 70 which is fixed to the upper and rear sides of the frame beam 14, extends generally horizontally and rearwardly therefrom and pivotally mounts at 72 the forward-converging ends of the upper links 60 and the upper ends of the straight front links 62 of the linkage assembly 54.

The hydraulic cylinder 56 is pivotally anchored at its forward cylinder end to a bracket 74 fixed to the rear side of the frame beam 14 and pivotally coupled at its rear piston end at 76 to the rear ends of the lower links 58 and the lower ends of the straight front links 62 of the linkage assembly 54.

It is readily seen in FIGS. 2 through 4 that the linkage assembly 54 swings along a generally vertical arcuate path about stationary pivot point 72 upon extension and retraction of the hydraulic cylinder 56. The angular relationship of the links 64 to the arcuate path of travel of the linkage assembly 54, when the bed assembly 30 is at either its rearwardly inclined position of FIG. 3 or its forwardly inclined position of FIG. 4, is designed to maximize the mechanical advantage of the lifting force being applied by the cylinder 56 to bed assembly 30 through the above-described linkage both as the cylinder 56 extends to or retracts from the FIG. 3 position or retracts to or extends from the FIG. 4 position. Such angular relationship of the links 64 to the arcuate path of travel of the linkage assembly 54 thereby facilitates smooth actuation of the cylinder 56 under maximum load conditions, such as when two bales are supported on the front half of the bed assembly 30 with the assembly 30 in its FIG. 3 position and it is desired to pivotally move the assembly 30 back to its horizontal position of FIG. 2 or such as when two bales are supported on the rear half of the bed assembly 30 with the assembly 30 in its FIG. 4 position and it is desired to pivotally move the assembly 30 back to its horizontal position of FIG. 2.

In order to pick up bales as the apparatus 10 is towed across the field and to move the bales along the rails 32, 34 of the bed assembly 30, there is provided bale delivering means, generally indicated by numeral 78. The means 78 includes a pair of endless flexible members in the form of conveyor chains 80 which each extend along one of the rails 32, 34 and about a rear drive sprocket 82 and a front idler sprocket 84 respectively rotatably mounted at opposite ends of its respective one of the rails 32, 34. An upper course 86 of each conveyor chain 80 runs along a track 88 defined on the upper side of its respective one of the rails 32, 34. A lower course 90 (FIG. 2) of each conveyor chain 80 travels within the hollow interior of its respective one of the rails 32, 34.

Each chain 80 is formed by an endless succession of interconnected links (not shown) and has a bale-engaging lug 92 mounted preferably to every fifth link thereof. Each lug 92 extends above the upper side of its respective one of the rails 32, 34 and also beyond the respective one of the front ends thereof so as to be exposed for engagement with the surface of a bale as the front or bale-receiving ends of the rails 32, 34 are brought into engagement with a bale as the apparatus is towed in the forward direction across the field. In such mounting arrangement of the chains 80 on the rails 32, 34, the bed assembly 30 is provided with what may be termed as a "live" end; that is, the portion of the apparatus 10 which first makes contact with the bale is the ones of the lugs 92 which are passing around the front ends of the rails 32, 34 from the lower chain courses 90 to the upper chain courses 86 as the conveyor chains 80 are moved along a counterclockwise path when viewed as in FIG. 2.

The "live" front ends of the rails 32, 34 and the aggressive nature of the conveyor chains 80, due to the provision of the lugs 92 thereon, allow the bed assembly 30 to "walk" under the round bale resting on the field as the apparatus is towed across the field.

Figures 5, 6, 7, 8, 9, 10, 11, 12, 13, 14, 15:
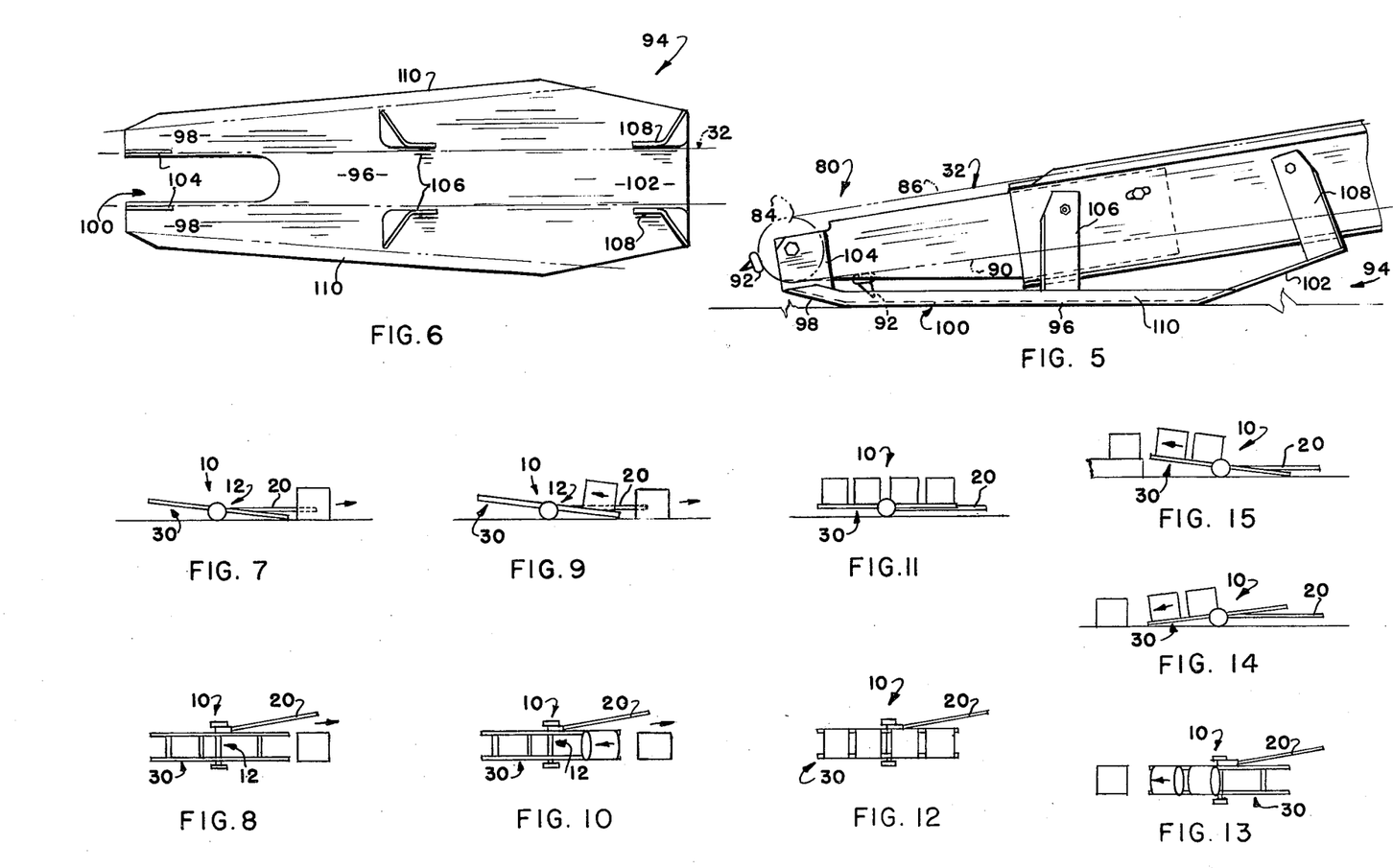
FIG. 5 is an enlarged elevational view of the forward end of the apparatus of FIG. 1 as seen from the left side of the apparatus when the bed assembly of the apparatus is in its rearwardly inclined position of FIG. 3, showing a ground engaging element which is mounted on each of the rails of the bed assembly for supporting the front rail end above the field.
FIG. 6 is a top plan view of the ground engaging element of FIG. 5.
FIGS. 7 through 15 are schematic representations of various stages in the bale handling operations carried out by the apparatus.

As seen in FIGS. 1 and 2, and more clearly in FIG. 5, a ground engaging element, preferably in the form of skid shoe 94, is mounted on each front end of the rails 32, 34 (only the right one of the front rail ends being illustrated in FIG. 5). The shoes 94 support the front rail ends above the field and thereby prevent the live front end from digging into the field due to the weight of the bale as the front end of the apparatus 10 is brought into engagement with the bale.

The shoe 94, also shown in FIG. 6, includes an elongated flat base portion 96 disposed flush with the surface of the field for sliding contact therewith when the rails 32, 34 are disposed in their rearwardly inclined position and the apparatus 10 is moving across the field. The base portion 96 extends laterally beyond opposite sides of its respective one of the rails 32, 34. A front nose portion 98 of the shoe 94 merges with the base portion 96 and is upturned at an acute angle with respect to the plane of the base portion 96. A central slot 100 is formed in the nose portion 98 and opens at the forward edge thereof. The slot 100 further extends for a short distance into the base portion 96 of the shoe 94. The slot 100 allows passage of the respective one moving conveyor chain 80 and its lugs 92 through the shoe 94 as the lower course 90 of the chain 80 reaches the front end of the respective one of the rails 32, 34. The shoes 94 disposes the respective front rail end above the field such that as the lugs 92 pass through the slot 100 on the lower chain course 90, the lugs 92 are brought into engagement with the field. Then, as the lugs 92 reach the respective front idler sprocket 84, they move out of engagement with the field along the circular path defined by the sprocket 84 and therefrom along the upper chain course 86. The aforementioned relationship of the lugs 92 with the field prevents the front ends of the rails 32, 34 from moving under the bale between its lower side and any strands of twine wrapped about the outer surface of the bale. Specifically, as the front rail ends move under the bale, the strands of twine are engaged by the lugs 92 and moved forwardly and upwardly around the front rail ends onto the upper sides of the rails 32, 34 with the bale.

The shoe 94 further includes a rear portion 102 which merges with the base portion 96 and is also upturned at an acute angle with respect to the plane of the base portion 96. Three pairs of upright laterally spaced apart brackets 104, 106, 108 are fixed respectively to the nose portion 98, the base portion 96 and the rear portion 102 and secured at their upper ends to the respective one of the rails 32, 34 for mounting each shoe 94 to its respective rail in the desired aforementioned manner. Furthermore, the nose and base portions 98, 96 of each shoe have upwardly and outwardly flared side edge margins 110, whereby no sharp edges are present on the base portion 96 of each shoe 94 which would cut into the field and cause accumulation of soil and debris on the shoes 94 and the front rails ends.

As seen in FIGS. 1 and 2, another ground engaging element, preferably in the form of another skid shoe 112, is mounted on each rear end of the rails 32, 34 for supporting the rear rail end on the field when the bed assembly 30 is tilted to its forwardly inclined position during unloading of bales.

Movement of the conveyor chains 80 is caused by drive means, being generally designated by numeral 114 in FIG. 1, which transmit rotary power preferably from the tractor power takeoff (not shown) to the conveyor chains 80. The drive means 114 includes a reversing gearbox 116 having an input shaft 117 adapted for coupling to the tractor power takeoff, an input drive train, generally designated 118 driven by the output side of the gearbox 116, another gearbox 120 mounted to the exterior side of the rear end of the left rail 34 and operated by the drive train 118, and an output drive shaft 122 rotatably mounted by and extending between the rear ends of the rails 32, 34 and extending from and driven by the gearbox 120. Rear drive sprockets 82, which respectively mount the conveyor chains 80, are secured to the output drive shaft 122 for rotation therewith. The right rear drive sprocket 82 may be adjusted laterally along the output drive shaft 122 toward the left rear drive sprocket 82 upon relocation of the right rail 32 to its above-described second space setting in closer relation to the left rail 34.

The drive train 118 includes a front drive shaft section 124 being rotatably mounted along the draft member 20 and operatively connected at its forward end to the output side of the reversing gearbox 116, and a rear drive shaft section 126 being rotatably mounted along the exterior side of the left rail 34 and drivingly coupled at its rear end to the input side of the gearbox 120. Further, the drive train 118 includes a telescoping drive shaft section 128 located above the upper draft member mounting plate 22 and pivotally and drivingly interconnecting the rear end of the front drive shaft section 124 and the forward end of the rear drive shaft section 126 by front and rear universal joints 130, 132, respectively, to thereby allow universal articulation of the shaft sections 124, 126 relative to each other.

The reversing gearbox 116 allows the conveyor chains 80 to be selectively driven in either a clockwise or counterclockwise direction. An actuating lever 134 is provided on the gearbox 116 for use by the operator in reversing the direction of operation of the gearbox 116.

A shield 136 is illustrated in FIG. 1 attached between the rails 32, 34 so as to overlie the output drive shaft 122 and thereby prevent wrapping of crop material about the shaft 122. Also, additional shields (not shown) may be mounted along the left rail 34 and draft member 20 for enclosing the drive train 98.

Alternatively, the drive means for causing movement of the conveyor chains 80 may take the form of a hydraulic motor disposed in the position of the gearbox 120 and supplied with fluid under pressure through hydraulic lines from any suitable source, such as the hydraulic system of some tractors.

CONVERSION BETWEEN TRANSPORT AND OPERATING POSITIONS

The aforementioned pivotal mounting arrangement of the draft member 20 of the apparatus 10 to the frame 12 allows conversion of the frame 12 and bed assembly 30 between a field or road transporting position generally aligned behind the towing tractor with the bed assembly 30 placed in its horizontal position by the hydraulic cylinder 56, and a field operating position generally aligned in offset relation to the right side of the tractor. The solid line location of the draft member 20 in FIG. 1 represents its position with respect to the bed assembly 30 in the road transporting position of the apparatus 10. The broken line location of the draft member 10 in FIG. 1 to the left of its solid line location represents its position with respect to the bed assembly 30 in the field operating position of the apparatus 10. Upon actuation of the hydraulic cylinder 25 so as to cause its extension or retraction, the frame 12 and bed assembly 30 are respectively pivoted relative to the draft member 20 to either the field operating position or the transporting position when the draft member 20 is attached to the towing vehicle. Deactuation of the cylinder 25 after its extension or retraction maintains the frame 12 and bed assembly 30 at either of these positions.

Vertically aligned pairs of holes 136, 138 are provided respectively in the vertically spaced apart draft member mounting plates 22, 23 which will receive a retaining pin (not shown) for assisting in the retention of the draft member 20 respectively in either one of aforementioned two locations after extension or retraction of the cylinder 25.

In FIG. 2, there is shown means, generally indicated by numeral 140, for coupling the bed assembly 30 to the draft member 20 when the bed assembly 30 is moved to its transport position and disposed at its horizontal position. The coupling means 140 includes first latch structure 142, in the form of a spring-loaded plunger, mounted on the draft member 20 and second latch structure 144, in the form of a plate having a slot (not shown) therethrough, mounted on the left rail 34 of the bed assembly 30 at the left end of the transverse member 36. The slot of structure 144 and the outer end of the plunger of structure 122 are aligned when the frame 12 and bed assembly 30 have been moved to the transport position and the bed assembly 30 is disposed in its horizontal position.

Mating of the plunger and slot is accomplished by bringing the plate of the second structure 144 and the plunger of the first structure 142 into contact with each other so as to compress the plunger. Then, slight vertical movement of the bed assembly 30 relative to the draft member 20 will bring the plunger and slot in the plate into alignment, at which time the spring loaded plunger will insert into the slot in a mated relationship therewith.

Disengagement or unmating of the plunger from the slot is achieved simply by pivoting the bed assembly 30 and frame 12 away from the draft member 20.

Therefore, it is readily seen that the coupling means 140 assists the hydraulic cylinder 56 in stabilizing the bed assembly 30 at its horizontal position during transporting of the apparatus 10 when the bed assembly 30 is loaded with bales.

BALE HANDLING OPERATIONS

FIGS. 7 through 15 schematically illustrate various stages in the bale handling operations performed by the apparatus 10.

FIGS. 7 through 10 illustrate the apparatus set up in field operating position and moving across the field with its frame 12 and bed assembly 30 offset to the right rear side of the towing vehicle (not shown), which would be attached to the forward end of the draft member 20, and the bed assembly 30 rearwardly inclined such that its forward end is disposed adjacent the field. For optimum results the ground speed of the towing vehicle should match the speed of rearward movement of the upper courses of the conveyors chains.

Large round bales are successively picked up from the field by the conveyor chains on the rails of the bed assembly 30 with the longitudinal axis of each bale extending parallel to the forward direction of apparatus movement and to the longitudinal axis of the bed assembly 30. Each bale being picked up, is carried by the upper courses of the conveyor chains along the rails toward the rear end of the bed assembly until the forward end of the bale clears the front end of the bed assembly. Then the operator stops driving the conveyor chains, thereby retaining the bale at such forward location, until the apparatus had advanced to the next bale. The operator again actuates driving of the conveyor chains upon reaching the next bale for picking up the bale as the apparatus continues its forward movement into engagement with bale. In such manner, the bale previously loaded on the bed assembly will be moved rearwardly through a distance equal to approximately one bale length as the next bale is being loaded onto the bed assembly. By repeating the aforementioned steps, four or five bales, depending on their respective sizes, will be loaded in single file arrangement on the bed assembly.

FIGS. 11 and 12 illustrate the apparatus in a fully loaded condition and after the bed assembly 30 has been returned to its horizontal position in preparation for transporting the bales from the field to a storage area. The draft member 20 is pivoted toward the bed assembly 30 to its solid line location as seen in FIG. 1 to set up the apparatus in road transporting position.

FIGS. 13 and 14 illustrate the apparatus 10 during unloading of bales at either a storage area or back onto the field. The bed assembly 30 has been tilted to its forward inclined position such that its rear end is disposed adjacent the ground. The conveyor chains are driven such that their upper courses move rearwardly as the apparatus is moved forwardly which causes the bales to be deposited on the ground in single file fashion with the same outer portion of the bale on which it was originally resting in the field now again in contact with the ground.

FIG. 15 illustrates the apparatus 10 during unloading of the bales onto an elevated storage area or the bed of a wagon or truck. The bed assembly 30 has been tilted to its rearwardly inclined position so as to position its rear end at the elevation of the bale receiving surface. Then the conveyor chains are driven such that their upper courses move rearwardly while the apparatus is maintained stationary which deposits the bales on the elevated surface.

It is thought that the invention and many of its attendant advantages will be understood from the foregoing description and it will be apparent that various changes may be made in the form, construction and arrangement of the parts of the apparatus described without departing from the spirit and scope of the invention or sacrificing all of its material advantages, the form hereinbefore described being merely a preferred or exemplary embodiment thereof.

Having thus described the invention, what is claimed is:

1. An apparatus for handling crop material packages, such as large round bales or the like, comprising:
    a mobile frame adapted for movement across a field;
    a bed assembly including a pair of elongated support members being mounted at generally similar locations between their opposite ends to said frame such that said members longitudinally extend generally in the direction of movement of said mobile frame, each of said members being laterally spaced apart from the other and throughout a substantial portion of its longitudinal extent defining therebetween an elongated generally unobstructed channel or passageway within which the lower cylindrical portion of a bale or the like may downwardly extend when said bale is received and supported along said members with its longitudinal axis extending generally parallel to said members, said bed assembly capable of being disposed in an inclined position with respect to the field in which corresponding one end portions of said support members are disposed adjacent the field;
    separate means movably mounted on and along each support member and having outer portions disposed for movement along a path extending along and above an upper side of each support member and around and beyond the terminus of said corresponding one end portion of each member for delivering a bale or the like from the field to said corresponding one end portions of said support members and into said passageway defined therebetween when said members are disposed in the inclined position;
    means for driving said movable means; and
    a separate ground engaging element attached to and extending along and below said one end portion of each member so as to underlie said one end portion for supporting the same above the field, the forwardmost end portion of said element having a forwardly-opening slot defined therethrough which underlies said one end portion for allowing passage of said movable means outer portions as the same move along and below and then beyond said one end portion of each support member and toward said terminus thereof to thereby insure engagement of said outer portions with the field and leading engagement of said outer portions with said bale or the like for facilitating insertion of said member end portions under said bale or the like and receipt of the same into said passageway defined between said members as said apparatus is moved across the field in the direction of said bale or the like, said each element also including an elongated flat base portion underlying said member end portion and being disposed rearwardly of said slotted forwardmost end portion of flush with the surface of the field for sliding contact therewith when said support members are disposed in said inclined position and said apparatus is moved across the field.

2. The apparatus as recited in claim 1, wherein said base portion of each of said ground-engaging elements further extends laterally beyond opposite sides of its respective one of said support member end portions.

3. An apparatus for handling crop material packages, such as large round bales or the like, comprising:
    a mobile frame adapted for movement across a field, said frame including a transverse beam;
    a bed assembly including a pair of elongated support members being mounted at generally similar locations intermediately between their opposite ends upon said transverse beam such that said members longitudinally extend generally in the direction of movement of said mobile frame, each of said members being laterally spaced apart from the other and throughout a substantial portion of its longitudinal extent being of a predetermined generally uniform height so as to define therebetween an elongated generally unobstructed channel or passageway above said transverse frame member within which the lower cylindrical portion of a bale or the like may downwardly extend when said bale is received and supported along said members with its longitudinal axis extending generally parallel to said members, said members having corresponding one end portions which each have a lower side that converges toward an upper side thereof to provide a configuration for said end portion which tapers toward the terminus thereof, said bed assembly capable of being disposed in an inclined position with respect to the field in which the corresponding one end portions of said support members are disposed adjacent the field with said lower sides of said end portions extending substantially parallel to the surface of the field;

separate means movably mounted on and along each support member and having outer portions disposed for movement along a path extending along and above said upper side of each support member and around and beyond said terminus of said corresponding one end portion of each member for delivering a bale or the like from the field to said corresponding one end portions of said support members and into said passageway defined therebetween when said members are disposed in the inclined position;

means for driving said movable means; and a separate ground engaging element attached to and extending along and below said corresponding one end portion of each member for supporting said member end portion above the field, each of said ground-engaging elements including an elongated flat base portion disposed generally parallel to and underlying said lower side of said corresponding one end portion and flush with the surface of the field for sliding contact therewith which together with said tapered configuration of said each corresponding member end portion facilitates insertion of said corresponding member end portions under said bale or the like as said apparatus is moved across the field in the direction of said longitudinal axis of said bale or the like, each of said elements further including a front nose portion merging with said base portion and being upturned at an acute angle with respect to the plane of said base portion and an opening being defined in said nose portion in the form of a slot which opens at the forward edge of said nose portion for allowing passage of said movable means outer portions and engagement thereof with the field for further facilitating insertion of said corresponding member end portions under said bale or the like.

4. The apparatus as recited in claim 3, wherein said nose and base portions of each element have upwardly and outwardly flared side edge margins.

5. The apparartus as recited in claim 3, wherein said slot in said nose portion further extends for a short distance into said base portion.

6. The apparatus as recited in claim 3, wherein said base portion of each of said ground-engaging elements further extends laterally beyond opposite sides of its respective one of said support member end portions.

* * * * *